Re. 25368

Oct. 29, 1957  S. C. RETHORST  2,811,323
ROADABLE AIRCRAFT
Filed July 23, 1953  4 Sheets-Sheet 1

INVENTOR
SCOTT C. RETHORST
BY
ATTORNEY

Oct. 29, 1957 S. C. RETHORST 2,811,323
ROADABLE AIRCRAFT

Filed July 23, 1953 4 Sheets-Sheet 2

INVENTOR
SCOTT C. RETHORST

BY
ATTORNEY

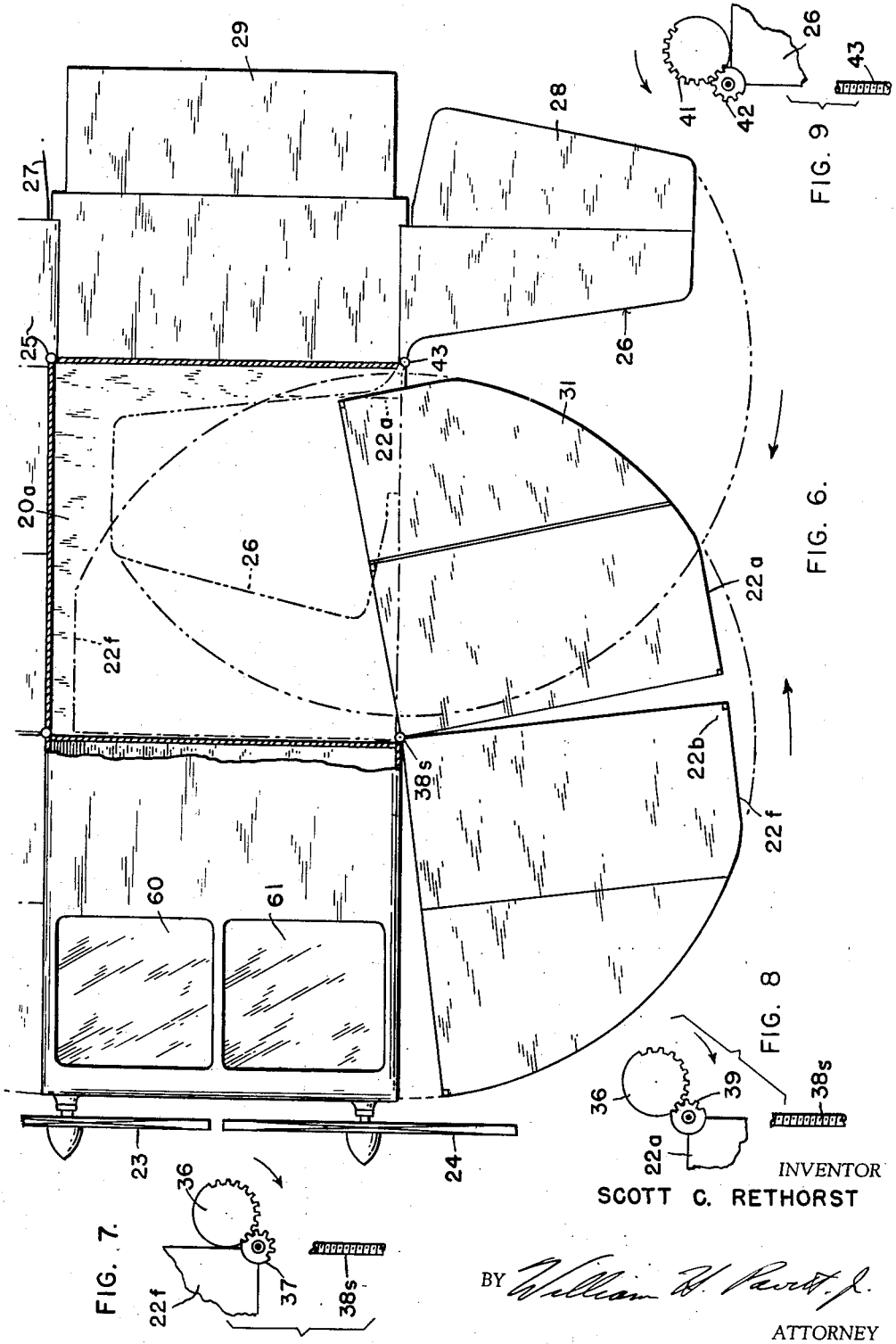

Oct. 29, 1957 S. C. RETHORST 2,811,323
ROADABLE AIRCRAFT
Filed July 23, 1953 4 Sheets-Sheet 4
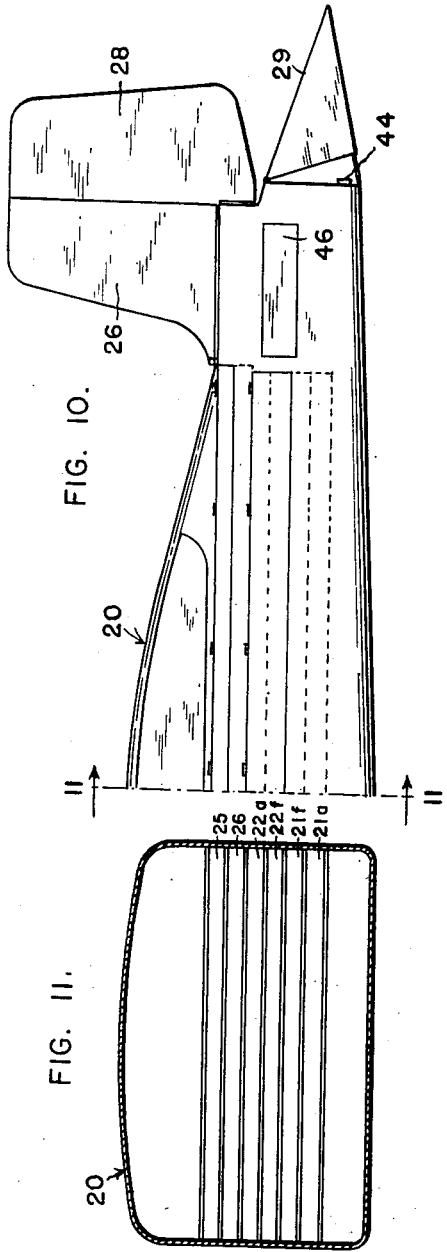
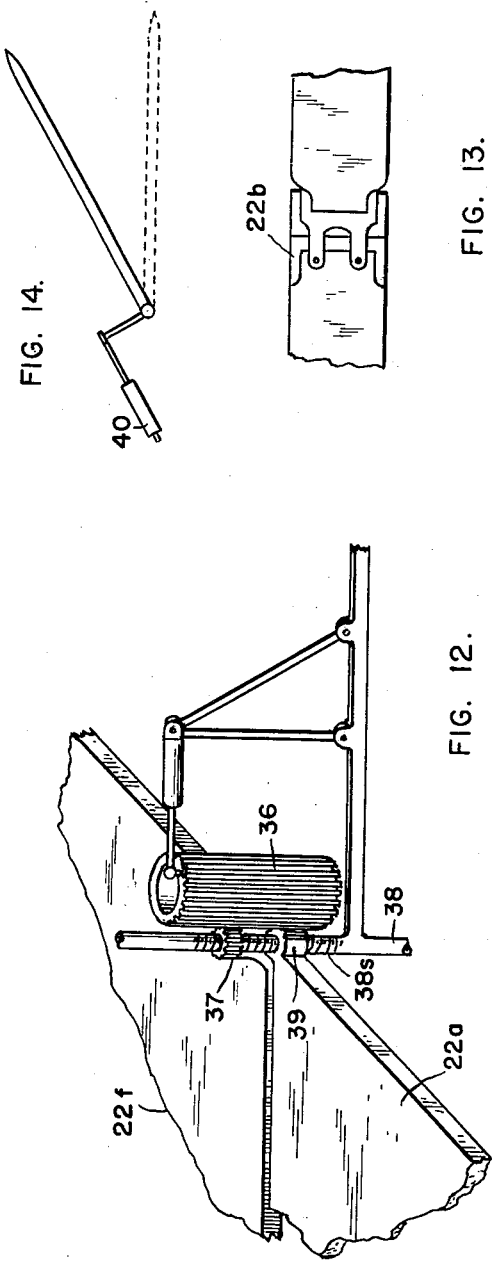
INVENTOR
SCOTT C. RETHORST
BY
ATTORNEY United States Patent Office 2,811,323
Patented Oct. 29, 1957

2,811,323

ROADABLE AIRCRAFT

Scott C. Rethorst, Pasadena, Calif.

Application July 23, 1953, Serial No. 369,763

19 Claims. (Cl. 244—2)

This invention relates to improvements in aircraft and has particular reference to an improved roadable aircraft of low aspect ratio which was the subject of my earlier Patents Nos. 2,561,291 issued July 17, 1951, and 2,681,773, issued June 22, 1954.

More particularly the invention relates to an aircraft of the flying wing type, having a low aspect ratio, with engine driven propellers so disposed that the entire aircraft is substantially completely immersed in the propeller slipstreams, and of dimensions that will permit travel on the ground over public highways, yet having stub wings mounted in a uniform fashion to provide increased span for flight.

The desirable objective of an inherently roadable aircraft that can travel along the ground over public highways without folding, movable, or removable wings is apparent. Such a highly useful aircraft was disclosed in my Patent No. 2,561,291.

The improvement described in my Patent No. 2,681,773 is directed essentially to the addition of stub wings, which are extendable for increased span, and yet may be so folded as to retain the essential advantages of an inherently roadable aircraft.

The further improvement offered in the present invention consists essentially of an improved means of mounting stub wings so that, when the vehicle is to travel on the highways, the stub wings may be retracted completely within the automotive configuration of the vehicle in such a manner as to be altogether removed from view and from the elements. It is a further object to retract the stub wings in such manner that the vehicle affords many features of an automobile, such as side door access and all-round visibility.

It can readily be shown by fundamental aerodynamic considerations that to sustain any given weight against the force of gravity by aerodynamic means the induced drag penalty will decrease as the mass of air to which downward momentum is imparted is made to increase. On the other hand, the parasite drag increases with this mass of air. Consequently design is a compromise to give the lowest total drag, yet permitting adequate low speed takeoff and performance characteristics. Clearly one of the chief factors determining the mass of air is the wing span, which normally is selected by these considerations.

In an inherently roadable aircraft, the eight foot maximum legal width of motor vehicles currently allowed on highways imposes an eight foot limit on the permanent span. In such a case the span for minimum drag and takeoff must accordingly be compromised, and since the eight foot span is considerably less than that required to lift a passenger carrying aircraft without special propulsive effort, means other than permanent span must be provided to increase the mass of air to which downward momentum is imparted, if efficiency is not to be seriously compromised.

Such a novel means for an inherently roadable aircraft is described in my Patent No. 2,561,291, in the form of substantially complete immersion of the aircraft in the propeller slipstreams. This feature produces a higher velocity, and hence a correspondingly lower pressure, over the upper surface of the wing, which induces the downward flow of a greater mass of air, with the further highly desirable feature of having this effect automatically increase as the forward flight speed decreases, thereby tending to offset the decrease in mass of air acted upon by the wing in consequence of the lower flight velocity. This novel feature adequately compensates for the reduction in span to eight feet, thereby achieving the much desired feature of inherent roadability in a light aircraft carrying a plurality of passengers. It also offers the further advantage of improved flight performance over conventional light aircraft.

It is apparent, however, that as the weight to be sustained increases, it will become increasingly difficult to compensate for the reductions in span from conventional dimensions, as determined by minimum drag and normal takeoff considerations, to the dimension of approximately eight feet as required to make the vehicle roadable.

It is, therefore, an object of this invention to provide a means for temporarily increasing the span so that greater weights may be sustained by an aircraft that is essentially inherently roadable, yet without encountering the disadvantage normally present in conventional folding wing aircraft, such as the extreme clumsiness of large, awkward and impractical wings.

A further object of the invention is to provide in an aircraft folding stub wings of airfoil shape in section which will provide additional span and yet essentially retain the advantages of an inherently roadable aircraft.

A still further object of the invention is to provide such stub wings of such shape in plan form that they may be retracted completely within the central airfoil section, which essentially constitutes the automotive configuration of the vehicle.

An additional object of the invention is to provide stub wings of such a shape in plan form that they may be mounted on the central airfoil section in a fashion that is exceedingly simple structurally, and yet lend themselves readily to the retracting operation.

Further, the invention provides stub wings of such a shape that in combination with the central airfoil they may be completely retracted into the central airfoil into a space aft of the pilot and passengers and forward of the tail structure, a space which must be provided and kept vacant in flight to keep the center of gravity sufficiently forward for balance, and which accordingly cannot otherwise be used. The actual retraction of the stub wings into this space on the ground moves the center of gravity aft for highway use, which is desirable for improved road riding characteristics.

Also, the invention provides stub wings of such a shape in combination with the central airfoil that the stub wings when retracted are completely within the central airfoil section in such a manner as to be invisible from outside, and so located as to permit use of the central airfoil section as a conventional automotive vehicle, with the usual side door access, front engine access, four wheels below, no encumbrances on top, and all around visibility.

This arrangement further permits the location of the stub wings when retracted substantially forward of the rear pair of wheels, that is, the substantial portion of the stub wings constituting the major part of their bulk or volume requirement may be so located. This achieves the highly desirable objectives, in the retracted configuration, of permitting all the principal elements of the vehicle, such as engines, people, stub wings, and wheels, to be in substantial fore and aft alignment, or to lie substantially in a common horizontal plane, thus providing a compact vehicle with a minimum frontal area.

A further advantage of the invention is the provision of improved lateral stability, by mounting the stub wings so as to provide adequate effective dihedral.

A still further advantage of the invention is the provision of improved lateral control. The stub wings are located at an increased distance from the center longitudinal axis of the aircraft. Differential lift forces assumed by the two stub wings, caused by movable trailing edge surfaces, or any suitable means, will therefore provide increased rolling moments about this axis, thereby improving the lateral control.

Finally, a further advantage of the invention is the provision of an improved landing gear and wheel arrangement such that the forward pair of wheels may be alternatively extended to a position suitable for landing as an aircraft, or retracted to a position suitable for operation as an automotive vehicle, said pair of wheels being steerable in both positions.

The features of my invention will be illustrated in the accompanying drawings and described in the following detailed specification, a certain preferred embodiment being disclosed by way of illustration only.

In the drawings, wherein like numerals refer to like or corresponding parts throughout the several views:

Figure 6 is a schematic plan view showing the retraction positions of the left stub wing sections and the left V-tail section;

Figure 7 is a top and partial side view of the gearing provided to rotate the left forward stub wing 180° into its retracted position;

Figure 8 is a top and partial side view of the gearing provided to rotate the left aft stub wing 90° into its retracted position;

Figure 9 is a top and partial side view of the gearing provided to rotate the left member of the V-tail 180° into its retracted position;

Figure 10 is a partial side view of the aircraft showing the apertures provided for retracting the stub wings and V-tail;

Figure 11 is a front section view taken along the line 11—11 of Figure 10, showing the stacking order of the stub wing and V-tail surfaces;

Figure 12 is a perspective view of the hydraulic actuating mechanism for retraction of the left stub wing sections;

Figure 13 is a view of the lock provided to attach the front and rear stub wing sections together;

Figure 14 is a view of the mechanism provided to rotate the V-tail surfaces 30° to the horizontal to permit the subsequent 180° rotation into the center airfoil section.

Figure 1:
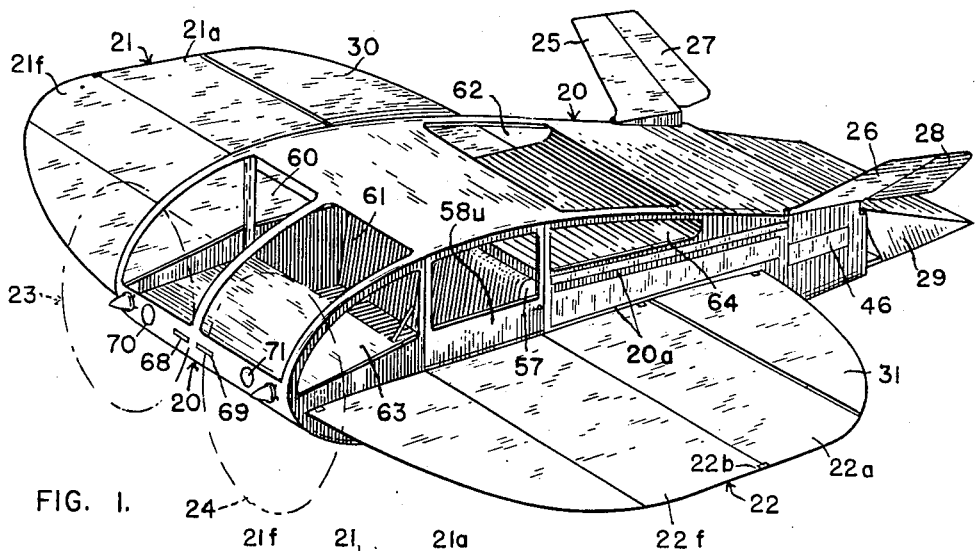
Figure 1 is an overall perspective view of a roadable aircraft embodying the features of the present invention, and showing the aircraft in normal flight.

Referring now to the drawings in more detail, and in particular to Figure 1, there is illustrated a flying wing type aircraft in accordance with the present invention comprising a main body, chassis, or fuselage 20 of airfoil shape, on the sides of which are mounted two stub wings, or supplementary airfoils, 21 and 22. These stub wings consist of fore and aft sections, designated 21f, 21a, 22f, and 22a, respectively. Two tractor propellers 23 and 24 are mounted on the leading edge of the main body 20 so as to substantially immerse the entire airfoil, consisting of the main body 20 and the two stub wings 21 and 22, in the propeller slipstreams.

Figure 5:
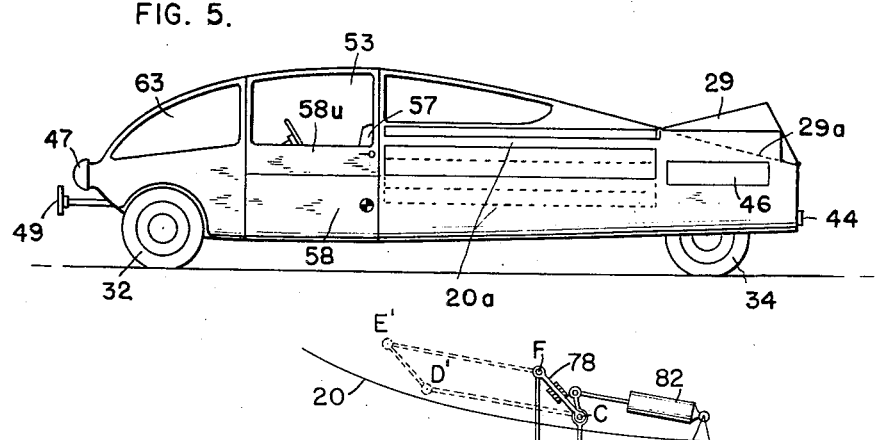
Figure 5 is a side view of the vehicle in the roadable configuration, showing the stub wings and V-tail retracted, the center section trailing edge surface folded forward, the propellers removed and stowed in their compartment, the front bumpers installed, and the wheels in the highway position.

In the preferred embodiment of the invention which I have illustrated the body of the aircraft, with the trailing edge control surface folded forward, the propellers removed, and with the stub wings and the V-tail in the retracted position for ground travel, is eight feet wide and twenty-three feet long. This ground configuration is shown in Figure 5.

The stub wings 21, 22 are mounted on a center airfoil 20 along a longitudinal line so that for ground travel they may be retracted into the space 20a aft of the pilot's compartment 53 and substantially forward of the flight position of the tail structure 25, 26 by simple rotation of the fore and aft stub wing sections 21f, 21a, 22f and 22a, in a horizontal plane about hinge points at the corners of the stub wing sections located at the inboard end of the transverse line along which such sections come together when they are extended. The stub wing sections are suitably raised or lowered in conjunction with their rotation so that the two left and two right sections when retracted are stacked vertically one above the other (see Fig. 11).

This arrangement of the stub wings permits the employment of substantial wing area, achieved in spite of the limitations on span through the use of a substantial stub wing chord along its inboard edge. In the embodiment illustrated in Fig. 1, the relative geometrical and mounting provisions disclosed herein permit the usage of an extensive inboard edge of the stub wings such that, when in the extended position, this inboard edge may extend through a substantial or major portion of the length of the chassis, where the chassis is understood to be the fixed portion of the central airfoil body, that is, the basic structure on which is mounted the movable surfaces, such as the stub wings 21, 22, the V-tail 25, 26, and the trailing edge surface 29.

Figures 4, 15:
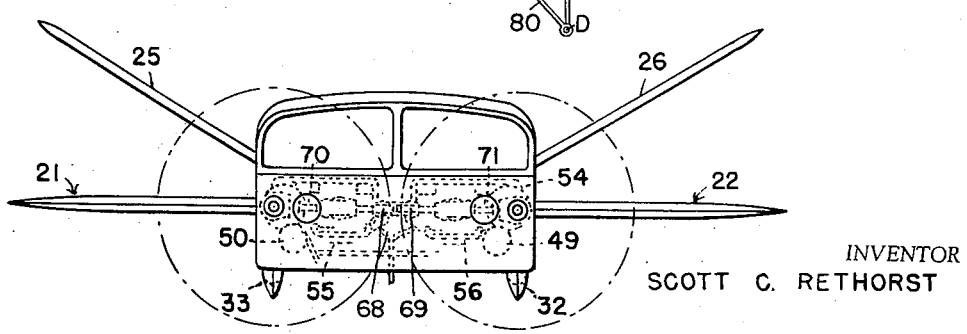
Figure 4 is a front view of the aircraft of Figure 1.
Figure 15 is a schematic detail diagram of the operation of the four-bar linkage shown in Fig. 3.

In the flight configuration the stub wings are extended as shown in Figure 1, and in the embodiment illustrated, the total span will then be approximately 23 feet. The airfoil for the center section is twenty-four feet in length, and in section is prescribed as NACA No. 104, which has a maximum thickness of twenty-one percent of the airfoil length, which in this case is then five feet. Two engines of 265 horsepower each are provided, each driving a propeller 82 inches in diameter. The two propellers are located with their plane one foot ahead of the leading edge of the central airfoil, giving an overall length for the aircraft of approximately twenty-five feet. These two propellers are located with a two inch clearance between their tips so that the total distance between the extreme propeller tips is 13.8 feet, as shown in Figure 4.

The entire aircraft, including the center section and the extended stub wings, forms a low aspect ratio airfoil of such dimensions that when in combination with the most efficient propeller dimensions and their location ahead of the leading edge, and considering the lateral displacement of the slipstreams due to the presence of the aircraft body, practically the entire aircraft is immersed in the propeller slipstreams and thereby induced drag is kept to a reasonable value at climbing and cruising speeds.

Stabilizing and control surfaces mounted on the aircraft, as shown in Figure 1, include a V-tail which consists of two fixed surfaces 25 and 26, mounted approximately 30° to the horizontal, on whose trailing edges are attached movable surfaces 27 and 28. This combination of surfaces provides in a conventional manner the stability characteristics and balancing and control moments necessary to provide the aircraft with desirable flying qualities. In particular, the fixed surfaces are mounted at an angle of incidence such that the vertical component of the aerodynamic force so provided varies with the angle of attack in such a manner as to provide adequate longitudinal stability. The lateral component of the aerodynamic force similarly provides lateral stability.

The movable surfaces 27 and 28 if operated together provide pitching moments for longitudinal control and if operated differentially provide yawing moments for directional control.

A movable trailing edge surface 29 is provided as part of the tail structure to balance the airfoil and give the required trim under the varying power and loading conditions that may be employed in the operation of the aircraft.

Also as indicated in Figure 1 ailerons 30 and 31 are mounted at the trailing edge of stub wing sections 21a and 22a respectively. These ailerons are operated differentially to obtain rolling moments for lateral control in a conventional manner.

Figure 3:
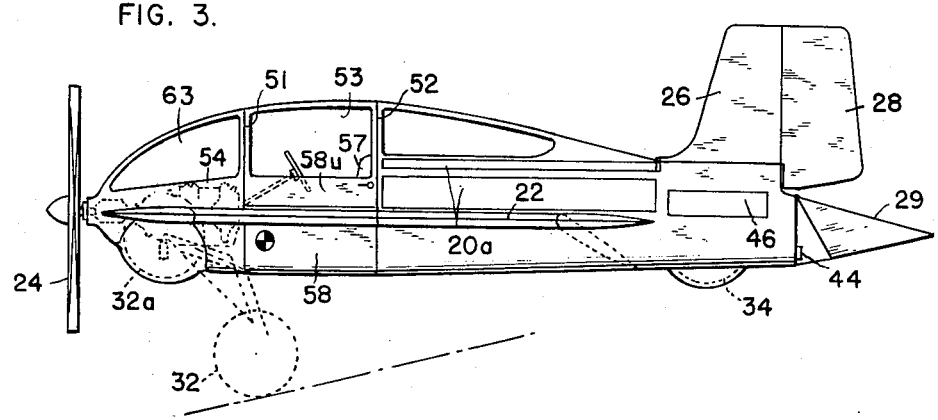
Figure 3 is a side view of the aircraft of Figure 1.

For landing, the retractable landing gear comprising the two forward wheels 32 and 33 are extended. The left side view of Figure 3 illustrates only the left front wheel 32. The rear wheels 34 and 35, although not mechanically extended, are released from their compressed spring position and allowed to extend by means of their own weight against their springs. The aircraft thus lands in a conventional manner on its four wheels as an increased angle of attack provided by the longer extension of the front wheels, employing a moderate amount of power to minimize both the angle of attack and the landing speed.

After landing, in order to convert to the configuration for highway travel, the two bladed propellers 23, 24 are stopped in a horizontal position, the front wheels 32, 33 are retracted, thereby lowering the vehicle body to a horizontal position; the stub wings 21, 22 and V-tail assembly 25, 26, 27, 28 are also retracted, the trailing edge surface 29 folded forward, the propellers 23, 24 removed and stored in their compartment, and the propeller shaft caps 47, 48 and front bumpers 49, 50 are installed. The vehicle then appears as shown in Figure 5.

The mechanism for stopping the propellers in a horizontal position could be a conventional spot disc brake with a preferred friction orientation. The mechanism for retracting the front wheels could be either electric or hydraulic, but again this mechanism is largely conventional and is not shown in detail.

In the retraction operation, however, the forward landing gear folds up forward to an alternative external position designated as 32a, as illustrated with the springs compressed in Figure 3, which allows the vehicle body to ride level with and close to the ground, which is desirable for highway operation.

This arrangement also improves the center of gravity location for ground travel. The aircraft has a conventional landing gear in the sense that the forward wheels 32 and 33, in the extended landing configuration as shown in Figure 3, are located only slightly forward of the center of gravity to minimize the control moments that must be applied by the elevators 27, 28 to vary the attitude of the aircraft in landing and takeoff maneuvers. Consequently, the movement of the wheels 32 and 33 to the forward position 32a locates these wheels farther ahead of the center of gravity than is ordinarily desirable for aircraft use, but which is highly desirable for highway use, distributing the weight of the vehicle body more nearly equally between the front and rear wheels, a condition prerequisite to good surface riding qualities.

The front wheels 32 and 33 are constructed and arranged for steering. The use of a four bar linkage as illustrated in Figures 3 and 15 to retract the forward landing gear permits the king pin to remain vertical, so that the wheels may be steered in either position. This four bar linkage is best illustrated schematically in Figure 15, where the four bars 78, 79, 80 and 81 constitute a parallelogram. The bar 78 is fixed in the vehicle structure in this schematic figure, although in practice this bar may be omitted since its function will be performed by the vehicle frame between points F and C. Bar 79 may be the main landing gear strut, which is rotated about point C by the action of the hydraulic cylinder 82. Bar 80 may be part of the axle assembly, and bar 81 is essentially the fourth link of the parallelogram. The effect of this assembly is to keep the bar 80 parallel to itself as it moves from its extended position as shown to its retracted position shown dotted. Thus, a conventional automotive type front wheel assembly mounted on this axle 80 will similarly maintain its kingpin parallel to itself throughout the retraction operation, thus permitting the wheels to be steered in either position.

Suitable auxiliary means are provided for driving the rear wheels in either direction, but as these largely conventional features form no part of the present invention they will not be described in further detail.

In order to retract the stub wings, I have preferably provided a hydraulic lock 22b, shown in Figure 13, for the left stub wing 22, connecting the fore and aft sections, which lock is first disengaged. The mechanisms for then retracting the stub wings may consist essentially of toothed gears mounted on the corners of the fore and aft stub wing sections 22f, 22a, 21f and 21a, located at the inboard end of the line of junction of such sections. These corner gears are mated with a geared drum 36 operated by a hydraulic cylinder as shown in Figure 12 for the left stub wing 22.

In particular, as shown in Figure 7, the left front wing section 22f contains at its point of rotation a gear 37 with teeth at least 180° mated to the drum 36.

The gear mounted on the stub wing section is cut with spiral gearing internally (not shown), mating spiral gearing 38s external to a vertical tube 38 in the aircraft structure, as shown in Figure 12. Thus the stub wing section is raised or lowered according to the direction of the spiral gearing 38s.

Similarly, as shown in Figure 8, the left aft wing section 22a contains at its point of rotation a gear 39 with teeth at least 90° mated to the same geared drum 36 of Figure 12.

Again the spiral gearing 38s raises or lowers the wing section 22a on the tube 38 according to the direction of the gearing provided.

The V-tail surfaces 25, 26, 27, 28 may be retracted in a similar fashion. However, the 30° inclination of these surfaces to the horizontal requires first that they be rotated to the horizontal plane by the hydraulic mechanism 40 illustrated in Figure 14. The surface is then rotated 180° in the horizontal plane about its forward inboard corner in the same manner as employed for the stub wings, as illustrated by Figure 9, where a hydraulically actuated tooth geared drum 41 rotates a mating gear 42 having 180° teeth. Again the gear 42 mounted on the surface corner is cut with internal spiral gearing mating with spiral gearing external to a structural tube 43 so that the surface may be raised or lowered suitably for stacking.

The retraction of the left surfaces, consisting of the force and aft sections 22f, 22a of the stub wing 22 and the left V-tail surface 26 with its movable appendage 28, is illustrated in Figure 6. As shown in this plan view, these three sections all retract into the space aft of the pilot's compartment 20a, where they are stacked one above the other.

The corresponding surfaces on the right side retract in a similar manner. The cumulation of thus stacked surfaces may be observed in Figure 11, which shows the disposition of the three left and three right surfaces.

The retraction of the stub wings and V-tail surfaces into the space aft of the pilot's compartment further improves the center of gravity location for ground travel, as the stub wings are of necessity considerably heavier than the V-tail, and the stub wings move aft in their retraction. This moves the center of gravity further aft to the position shown in Figure 5, distributing the weight of the vehicle body more nearly equally between the front and rear wheels, thereby improving the surface riding characteristics.

Also for ground operation of the craft, the trailing edge surface 29 folds forward to the position 29a as shown in Figure 5. This folding removes this lightly constructed and critical aerodynamic surface 29 from its posterior location vulnerable to traffic damage and exposes instead rear bumpers 44 and 45 to protect the rear of the vehicle. The surface 29 itself in folding to 29a is protected forward of and above the bumper line.

The final operation required for the conversion for highway travel is the manual removal of the propellers 23 and 24 and their storage in a compartment 46 provided in the rear of the vehicle, as shown in Figure 5. This relocation of the propellers to an aft position further aids in distributing weight onto the rear wheels to improve riding characteristics. The propeller shaft caps 47 and 48 and front bumpers 49 and 50 are installed when the propellers are removed.

These operations complete the conversion of the vehicle for ground travel to the configuration shown in Figure 5. The vehicle is now in all principal regards a conventional automobile. It is a four wheel vehicle of conventional automotive size, shape, suspension, and power, with front wheel steering and rear wheel drive.

Figure 2:
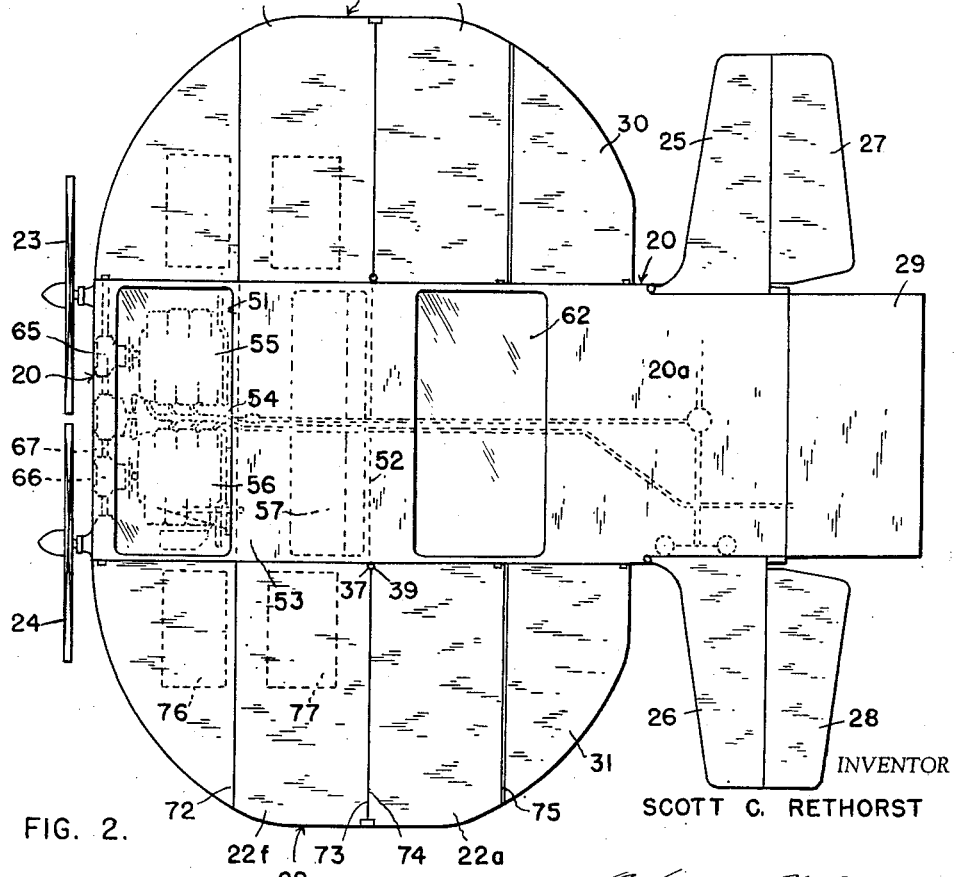
Figure 2 is a top plan view of the aircraft of Figure 1.

The interior arrangement of the vehicle may be as illustrated in Figures 2 and 3. As shown particularly in Figure 3, a relatively thick airfoil section (NACA No. 104, TR 391) is employed in order to provide adequate space to house both passengers and engines. The basic structure comprises a main box spar consisting of the upper and lower surfaces of the airfoil 20 adjacent to the substantially vertical web portions 51 and 52 and constituting a passenger compartment 53 entirely located within the fuselage 20 wherein there is provided space for a pilot and passengers. The engine compartment 54 is entirely located within the forward end of the fuselage 20, ahead of the forward web 51 of this box spar. This engine compartment 54 in the present embodiment contains two suitable engines of any conventional type, such as reciprocating or gas turbine, designated by reference numerals 55 and 56 in Figure 2. If gas turbine engines are used they may achieve propulsion either through propeller means or directly as jet propulsion.

By this arrangement the major loads are concentrated near the center of gravity and the necessity for auxiliary firewalls is obviated. The noise in the passenger enclosure is also reduced by the isolation of the engines in a forward compartment.

As shown in Figure 2, the center portion of the fuselage 20 constitutes a pilot and passenger enclosure 53 provided with a transversely extending seat 57. Conventional automotive type side doors 58 and 59, the left side of which is shown in Figure 3, are provided at either side of the vehicle giving access to the pilot and passenger enclosure 53. The upper half of the side doors 58 and 59, designated 58u and 59u, may be opened even when the stub wings are extended, thereby providing emergency exit in flight or in unusual circumstances when it is not possible or feasible to first retract the stub wings.

The usual controls and instruments are provided in the pilot's compartment, but as these features may follow conventional practice they are not shown in the drawings or described in detail.

As shown in Figure 1, the upper portions 60, 61 and 62 of the center airfoil, as well as the access door 58u and the other side panels 63 and 64 (and similar panels not shown on the opposite side of the fuselage) substantially surrounding the passenger compartment 53 are constructed of a transparent material such as glass or Plexiglas. These sections may include a plurality of strengthening ribs (not shown) for withstanding aerodynamic forces.

As seen in Figure 2, the engines 55 and 56 mounted within the compartment 54 are connected to overriding clutch mechanisms 65 and 66 so that in the event of failure an engine may disengage and the other engine because of the cross-connecting shaft 67 will drive both propellers 23 and 24.

The air intake ducts 68 and 69 for engine cooling and carburation open from the leading edge into the engine compartment 54 in a conventional manner, as shown in Fig. 4. It is apparent that the automotive nature of the vehicle readily permits incorporation of other conventional features, such as lights, the forward elements of which are shown as 70 and 71.

The stub wings 21 and 22 are constructed in a conventional manner, with spanwise beams transmitting the air loads to the center structure. As shown in Figure 2, the forward section of the left stub wing 22f, contains two such beams 72 located so as to lock with the forward web 51 of the center section, and 73 at the trailing edge leading into the rotating mechanism 37.

The aft section of the left stub wing 22a similarly contains the spanwise beams 74, at the leading edge extending into the rotating mechanism 39, and 75, located so as to lock at a strong point of the center section structure. The beam 75 also serves as a support for the hinging of the movable aileron 31 constituting the trailing edge of the left stub wing 22.

Fuel is carried in the left stub wing in tanks 76 and 77 as shown in Figure 2. Such location of the fuel in the stub wings, structurally isolated from the center section containing the engines, pilot, and passengers, offers considerable protection from the hazard of fire both in normal operation and in the event of a crash.

The right stub wing 21 is similarly constructed, with its several spanwise beams and fuel tanks located in a reflected sense with respect to the longitudinal center line of the aircraft.

From the foregoing detailed description, it will be apparent that the present invention provides a flying wing aircraft of low aspect ratio with two propellers of conventional diameter mounted on the leading edge of the wing whereby the entire aircraft is substantially completely immersed in the propeller slipstreams. The aerodynamic reasoning outlining in detail the manner in which this arrangement increases lift is given in my U. S. Patent No. 2,561,291.

While I have indicated above the dimensions of a preferred embodiment of my invention based upon maximum utilization of an eight foot permanent span, permissible where the aircraft is intended to travel after landing upon the public highways, it will readily occur to one skilled in the aircraft design art, upon studying this specification and the annexed drawings, to design aircraft of different dimensions and configurations but nevertheless utilizing the principles of my invention herein taught. It appears desirable to me, therefore, to specify in general terms the preferred bounds of the factors defining a successful aircraft constructed according to my invention. Moreover, certain of these factors have not been previously detailed and should be spelled out in more universally applicable terms. The terms which I have thus selected define the unique combination of engine size and rating, and propeller and fuselage-wing dimensions of my aircraft which may be adapted to both an automotive configuration for land travel as well as a flying machine having a much wider range of flying speeds over conventional aircraft.

This novel combination is defined most conveniently by the following ratios:

$$\frac{\text{Sum of propeller diameters}}{\text{Total wing span}} = \frac{D(\text{total})}{b} \geq 0.5$$

$$\frac{W^{3/2}}{D\sqrt{\sigma \eta HP}} = K \geq 34$$

$$\text{Aspect ratio} = \frac{b^2}{S} \leq 2$$

The first ratio expresses in terms of a lower bound the condition that the airfoil be substantially completely immersed in the propeller slipstream, taking into account the lateral displacement of the slipstream due to the presence of the relatively larger central body and the fact that the wing tips, due to taper, contribute less area per unit of span than the central section. For multi-propeller aircraft, the diameter of concern in this ratio is the total diameter, or sum of the diameters of the several propellers.

The second ratio similarly states in terms of an upper bound the unique distribution of the propulsive energy in the slipstream per unit aircraft weight which I have discovered gives an appreciable improvement in the range of flying speeds, when used with the other two ratios. In this second ratio W is the aircraft weight per engine in pounds, HP is the horsepower per engine, D is the diameter of the propeller in feet driven by this engine, $\eta$ is the efficiency of this propeller, and $\sigma$ is the ratio of the air density at the operating altitude to that at sea level. This ratio for convenience is written in an equivalent reciprocal form with a lower bound.

The third ratio defines the range of aspect ratios for which the improved performance provided by this invention is most pronounced, and which permit the vehicle to be converted to a conventional automotive configuration by the novel means disclosed herein. For a vehicle as disclosed herein, where the central body because of its near airfoil shape, and its substantial width relative to the total airfoil span, carries a substantial part of the total lift, the area S in the aspect ratio expression is the total plan form area, exclusive of the V tail sections, but including the central airfoil body and its trailing edge segment, as well as the stub wings.

The significance of the unique combination of engine, propeller, and wing dimensions thus disclosed is made evident by the following fundamental considerations:

The primary function of a propulsive device on a conventional aircraft is to provide thrust for acceleration and to overcome aerodynamic drag. On the other hand, if the propulsive device is to provide in a direct manner a thrust sufficient to allow an aircraft to hover, the thrust must at least equal the weight of the aircraft. Thus the ratio of thrust to weight, in exceeding or not exceeding unity, differentiates between aircraft limited in their overall performance abilities by hovering considerations and those which are free of such limitations and are accordingly able to extend particularly in a feasible manner their high speed performance capabilities.

The thrust produced by an engine propeller combination is shown by Dr. Max M. Munk in his "Elements of Theoretical Fluid Dynamics," page 137 to be:

$$T = \frac{\pi D^2}{4}(V+v)\rho v'$$

where $$\frac{\pi D^2}{4}$$

is the area of the propeller disc, and $v$ and $v'$ are the velocity increments at the propeller disc and in the final slipstream respectively; and $v' = 2v$. V is the flight velocity and $\rho$ the air density.

In hovering, the velocity V becomes zero, hence in this case:

$$T = \frac{\pi D^2}{2}\rho v^2$$

or, solving for $v$:

$$v = \sqrt{\frac{2T}{\pi \rho D^2}}$$

but by definition:

$$\text{Power} = P = Tv = \sqrt{\frac{2T^3}{\pi \rho D^2}}$$

Also if $\eta$ is the propulsive efficiency, by definition:

$$\eta HP = \frac{P}{550} = \frac{\sqrt{\frac{2T^3}{\pi \rho D^2}}}{550}$$

For hovering, T may be replaced by its equivalent W = weight, and it is seen that for this case a minimum propeller (or rotor) diameter is required:

$$D \geq \frac{W^{3/2}}{550\sqrt{\frac{\pi \rho}{2}} \eta HP}$$

This may be written as a ratio with an upper bound as $$\frac{W^{3/2}}{D \eta HP} \leq 550\sqrt{\frac{\pi \rho}{2}}$$

or in terms of $$\sigma = \rho/\rho_0$$

the ratio of air density at any operating altitude to that at sea level:

$$\frac{W^{3/2}}{D\sqrt{\sigma}\eta HP} \leq 550\sqrt{\frac{\pi \rho_0}{2}}$$

Inserting the standard value of $\rho_0 = .002378$ slugs/cu. ft., it is seen that for a machine to hover this ratio K has an upper bound:

$$K = \frac{W^{3/2}}{D\sqrt{\sigma}\eta HP} \leq 34$$

Examination shows this formula to be quite logical. Sea level $$\sqrt{\sigma}$$

is of course unity. $\eta$ is determined by the design geometry of the particular machine in question, but to study this formula a reasonable value such as 0.7 may be assumed. This leaves in the ratio as variables only $W^{3/2}$ in the numerator, and D and HP in the denominator. Thus if W were increased, and the machine is still to hover, either D or HP, or both, must be increased such that the ratio does not increase sufficiently to exceed its upper bound.

Hence in order to hover as described, a machine must employ a value of K less than the hovering bound of 34, thereby accepting a geometrical configuration such as to severely limit the high speed performance capabilities of the machine, unless such performance is provided by the very expensive and inefficient means of an extremely low power loading. The aircraft of my present invention, on the other hand, does not operate on this principle, and is accordingly not so limited. This aircraft in contrast achieves near hovering low speed performance by a different unique means described below, a means which does not require the great expense nor the high speed limitations of a large propeller or rotor diameter, nor the great expense of a low power loading. This unique means is best expressed by a large value of the parameter K. This is illustrated by the above expressions for power and thrust at zero forward velocity $$\text{Power} = Tv = \frac{\pi D^2}{2}\rho v^3$$

where for a given power, i. e., size engine, thrust T is inversely proportional to the velocity $v$ thru the propeller disc. Yet for a given thrust, the propeller diameter D is inversely proportional to the velocity $v$ thru the propeller disc. Hence a hovering machine, which does not use this velocity, or the related slipstream velocity for lift perpendicular to the thrust axis, will necessarily sacrifice $v$ to maximize T, which in turn can be accomplished by providing a large D.

The minimum D which can be employed, for a given size engine, i. e. a given power, for a given weight machine, is precisely that required to satisfy the upper bound on K for hovering.

The present invention provides a way to achieve adequate lift at low flight speeds without the limitations of large, cumbersome propellers or rotors imposed by the factor K in the case of hovering machines. This invention utilizes the increased lift force perpendicular to the propeller thrust axis, which as shown in my prior U. S. Patent No. 2,561,291, can be expressed as $$L = C_L \tfrac{1}{2} \rho S V_s^2$$

where $V_s$ is the velocity of the slipstream in which the aircraft is immersed, which is written above as $v'$, and is equal to $2v$. $C_L$ is the lift coefficient referred to flight velocity.

To maximize this lift force it is desirable to maximize $v$, which is just the opposite of the requirement for hovering machines. In fact, the aircraft of the present invention is free to use the largest value of K possible, consistent with other requirements. Since the value of $K=34$ is thus a clearly defining element between machines that are limited in their overall performance by the requirement for hovering by direct thrust and those being free from the hovering requirement might employ the unique means herein disclosed of augmenting the lift force perpendicular to the thrust axis, the value of $K=34$ is clearly a lower bound for the present invention, which provides increased lift at low flight speeds in the improved manner described.

While a preferred form and method of employing the invention have been disclosed in detail, it is to be understood that the invention lends itself to numerous variations without departing from the basic principles on the scope of the appended claims.

Having thus described my invention, what I claim as novel and desired to secure by Letters Patent of the United States is:

1. In an aircraft adapted to be operated upon public highways as well as in the air, a wheel arrangement, said arrangement comprising two pairs of wheels, the wheels of each pair being laterally spaced from each other, and rotating about a common line, one of said pairs of wheels being disposable for landing and takeoff in extended position below the aircraft a predetermined distance forward of the center of gravity, and the other pair being disposed at a greater distance aft of the center of gravity, whereby a substantially greater portion of the weight of the aircraft is borne on the forward pair of wheels than on the after pair, said forward pair of wheels being further retractable to a position a substantially greater distance forward of the center of gravity, for alternative operation of the aircraft upon a highway to obtain a more equalized distribution of load upon the two pairs of wheels for improved riding, said forward pair of wheels further being provided with means to accomplish steering thereof, said alternative disposition of the forward wheels being effected by providing four-bar linkages operable in vertical planes, said steering means being so disposed in said linkages, as to permit the latter to shift the steering means and associated wheels from extended landing position to highway driving position without substantially changing the direction of the axis about which the planes of these wheels are rotated for steering.

2. A vehicle adapted to travel both on land and in the air, said vehicle comprising a chassis, said chassis being in the shape of an airfoil including a forward compartment for occupancy and an aft storage compartment and having supporting elements extendable from said chassis, a pair of supplemental airfoils each pivotally mounted on the chassis at one side thereof for swinging movement between extended and retracted positions, said supplemental airfoils each having an inboard edge extending through a major portion of the length of the chassis when in the extended position and being housed within the storage compartment when swung into the retracted position, and propulsive means mounted on the chassis at the leading edge thereof to propel the vehicle in the air.

3. The vehicle as defined in claim 2 wherein the chassis includes slotting on each of its sides, said slotting being of such size and extent as to be adapted to receive the supplemental airfoils and to contain them within the storage compartment when in the retracted position.

4. In an aircraft having a fuselage in the shape of an airfoil, a pair of supplemental airfoils, each of said last mentioned airfoils being securable along its inboard edge to extend horizontally from one side of the fuselage, each of said supplemental airfoils being divided transversely through a point disposed on the inboard edge of the said supplemental airfoil and located a distance from the most aft point on the trailing edge of the last said airfoil only slightly less but not greater than the span of the fuselage to form a forward section and an aft section, the forward section having a chord less than the distance between said dividing point and the trailing end of the fuselage and a span only slightly less than not greater than the span of the fuselage, both said sections being pivotable horizontally about a common vertical axis disposed on the side of the fuselage, slotting in each side of the fuselage, said slotting being of such size and extent as to be adapted to receive the supplemental airfoil sections and to contain them substantially within the overall configuration of the fuselage when said airfoil sections are retracted, powered means to rotate said sections about said common axis from said slotting to extended position, and back into said slotting, and means to lock said sections when extended into rigid engagement with the sides of the fuselage and with each other.

5. In a vehicle having a fuselage, said fuselage being in the shape of a primary airfoil, a pair of supplemental airfoils, each of said last mentioned airfoils being securable along its inboard edge to extend horizontally from one side of the fuselage, each of said supplemental airfoils being divided transversely through a point disposed on the inboard edge of the said supplemental airfoil and located a distance from the most aft point on the trailing edge of the last said airfoil only slightly less but not greater than the span of the fuselage, to form a forward section and an aft section, the forward section having a chord less than the distance between said dividing point and the trailing end of the fuselage and a span only slightly less and not greater than the span of the fuselage, both said sections being pivotable horizontally about a common vertical axis disposed on the side of the fuselage, slotting in each side of the fuselage, said slotting being of such size and extent as to be adapted to receive the supplemental airfoil sections and to contain them substantially within the overall configuration of the fuselage when said airfoil sections are retracted, powered means to rotate said sections about said common axis from said slotting to extended position, and back into said slotting, and means to lock said sections when extended into rigid engagement with the sides of the fuselage and with each other.

6. In the vehicle as defined in claim 5 wherein the fuselage provides a forward compartment for personnel occupancy with forward and rear vision, and the slotting to receive the supplemental airfoil sections is disposed below the level rear vision.

7. A vehicle adapted to travel on land and in the air, said vehicle comprising a primary low aspect ratio airfoil body, the trailing edge segment of said airfoil body being rigidly securable at the trailing edge of the remaining portion of the body for normal flight operations, or alternatively movable by folding about a spanwise hinge line at the forward edge of said trailing edge segment to a position forward of and above its last named position.

8. An aircraft comprising a primary low aspect ratio airfoil body, said body providing an engine compartment in its forward portion, a supplemental airfoil storage compartment in its aft portion, and a pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, both pairs of wheels being arranged to provide support for the airfoil body when on the ground, a pair of supplemental airfoils, each said supplemental airfoil being pivotally mounted on said body for swinging movement to and from a laterally extended position, and means to swing said supplemental airfoils to a retracted position within said storage compartment, substantially forward of the rear pair of wheels, and substantially below the pilot's horizontal line of sight to the rear.

9. An aircraft as defined in claim 8, said aircraft having, in addition, at the after extremity of at least a portion of said primary airfoil body, controllably variable tail surface means adapted to provide yawing and pitching moments for flight control, and means to retract said tail surface means to a position substantially within the overall configuration of the primary airfoil body aft of the pilot's compartment.

10. An aircraft comprising a low aspect ratio airfoil body, said body providing an engine compartment in its forward portion, a supplemental airfoil storage compartment in its aft portion, and a pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, both pairs of wheels being arranged to provide support for the airfoil body when on the ground, a pair of supplemental airfoils, each said supplemental airfoil being pivotally mounted on the body for swinging movement to and from a laterally extended position, to provide an increase in total airfoil span, variable tail surface means adapted to provide yawing and pitching moments for flight control, wherein the supplemental airfoils are of greater weight than the tail surface means, and both said supplemental airfoils and tail surface means are swingable to retracted positions within said storage compartment of the airfoil body behind the pilot's compartment, said supplemental airfoils being, when retracted, positioned substantially forward of the rear pair of wheels, and substantially below the pilot's horizontal line of sight to the rear, whereby, when such retraction occurs, the center of gravity of the aircraft is moved aft at least some degree.

11. An aircraft comprising a primary low aspect ratio airfoil body, said body providing an engine compartment in its forward portion, a storage compartment in its aft portion, and a pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, both pairs of wheels being arranged to provide support for the airfoil body when on the ground, a pair of supplemental airfoils, each said supplemental airfoil being rigidly securable to said body in laterally extendable position, to provide an increase in total airfoil span, means to retract said supplemental airfoils to positions substantially within the overall configuration of the primary airfoil body aft of the pilot's compartment, substantially forward of the rear pair of wheels, and substantially below the pilot's horizontal line of sight to the rear, and powered tractor propeller means disposed ahead of the leading edges of the said primary airfoil body and supplemental airfoils to immerse the substantial portion of said primary airfoil body and supplemental airfoils in the slipstream thereof, said aircraft having, in addition, controllably variable tail surface means adapted to provide yawing and pitching moments for flight control, said tail surface means being hinged about a vertical axis, means first, to rotate said tail surface means about a horizontal axis at their inboard ends to a horizontal plane, and second, to pivot said tail surface means forward about the said vertical axis into a position behind the pilot's compartment and substantially within the overall configuration of the primary airfoil body.

12. In an aircraft, a primary low aspect ratio airfoil body, said body providing an engine compartment in its forward portion, a supplemental airfoil storage compartment in its aft portion, and a pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, a pair of supplemental airfoils, each said supplemental airfoil being pivotally mounted on the body for swinging movement to and from a laterally extended position, to provide an increase in total airfoil span, variable tail surface means adapted to provide yawing and pitching moments for flight control, and means to swing both said supplemental airfoils and said tail surface means to retracted positions within said storage compartment of the primary airfoil body aft of the pilot's compartment, the supplemental airfoils, when retracted, being positioned substantially forward of the rear pair of wheels and substantially below the pilot's horizontal line of sight to the rear.

13. An aircraft comprising a fuselage, said fuselage providing an engine compartment in its forward portion, an airfoil storage compartment in its aft portion, and a pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, both pairs of wheels being arranged to provide support for the aircraft when on the ground, a pair of airfoils, each said airfoil being pivotally mounted on said fuselage for swinging movement to and from a laterally extended position, and means to swing said airfoils to a retracted position within said storage compartment, substantially forward of the rear pair of wheels, and substantially below the pilot's horizontal line of sight to the rear.

14. An aircraft as defined in claim 13, said aircraft having, in addition, at the after extremity of said fuselage, controllably variable tail surface means adapted to provide yawing and pitching moments for flight control, and means to retract said tail surface means to a position substantially within the overall configuration of the fuselage aft of the pilot's compartment.

15. An aircraft comprising a fuselage, said fuselage providing an engine compartment in its forward portion, an airfoil storage compartment in its aft portion, and a pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, both pairs of wheels being arranged to provide support for the aircraft when on the ground, a pair of airfoils, each said airfoil being pivotally mounted on said fuselage for swinging movement to and from a laterally extended position, to provide adequate airfoil span, variable tail surface means adapted to provide yawing and pitching moments for flight control, wherein the airfoils are of greater weight than the tail surface means, and both said airfoils and tail surface means are swingable to retracted positions within said storage compartment of the fuselage behind the pilot's compartment, the airfoils being, when retracted, positioned substantially forward of the rear pair of wheels and substantially below the pilot's horizontal line of sight to the rear, whereby, when such retraction occurs, the center of gravity of the aircraft is moved aft at least some degree.

16. An aircraft comprising a fuselage, said fuselage providing an engine compartment in its forward portion, a storage compartment in its aft portion, and pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, both pairs of wheels being arranged to provide support for the aircraft when on the ground, a pair of airfoils, each said airfoil being rigidly securable to said fuselage in laterally extendable position, to provide adequate airfoil span, means to retract said airfoils to positions substantially within the overall configuration of the fuselage aft of the pilot's compartment, substantially forward of the rear pair of wheels, and substantially below the pilot's horizontal line of sight to the rear, and powered tractor propeller means disposed ahead of the leading edges of the fuselage and airfoils to immerse the substantial portion of said aircraft in the slipstream thereof, said aircraft having, in addition, controllably variable tail surface means adapted to provide yawing and pitching moments for flight control, said tail surface means being hinged about a vertical axis, means first, to rotate said tail surface means about a horizontal axis at their inboard ends to a horizontal plane, and second, to pivot said tail surface means forward about the said vertical axis into a position behind the pilot's compartment and substantially within the overall configuration of the fuselage.

17. In an aircraft, a fuselage, said fuselage providing an engine compartment in its forward portion, an airfoil storage compartment in its aft portion, and a pilot's compartment intermediate of said engine compartment and said storage compartment, a wheel arrangement, said arrangement comprising two pairs of wheels, the wheels of each pair being laterally spaced from each other, and rotating about a common line, one of said pairs of wheels being disposed forward of the center of gravity of the aircraft, and the other pair being disposed aft of said center of gravity, a pair of airfoils, each said airfoil being pivotally mounted on the fuselage for swinging movement to and from a laterally extended position, to provide an adequate airfoil span, variable tail surface means adapted to provide yawing and pitching moments for flight control, and means to swing both said airfoils and said tail surface means to retracted positions within said storage compartment of the fuselage aft of the pilot's compartment, the airfoils, when retracted, being positioned substantially forward of the rear pair of wheels and substantially below the pilot's horizontal line of sight to the rear.

18. A vehicle adapted to travel both on land and in the air, said vehicle comprising a chassis, said chassis being in the shape of an airfoil, said chassis further providing a forward compartment for occupancy, and having wheel elements extendable from, and retractable within the configuration of, said chassis, a supplemental airfoil extendable horizontally from each side of said chassis and rigidly securable thereto along its inboard edge in extended position, the one-quarter chord line of said supplemental airfoils, when so extended, being substantially in fore-and-aft alignment with the center of gravity of the vehicle, each of said supplemental airfoils having a span closely approaching but not greater than the span of the chassis measured along a line transverse to the chassis at the point of attachment of the supplemental airfoils to the chassis, and said supplemental airfoils being retractable within the overall configuration of the chassis, a pair of tractor propellers disposed side by side on the leading edge of the chassis, said propellers having their combined diameters in excess of one half of the aggregate of the spans of the chassis and of the pair of supplemental airfoils when extended, means in said chassis to drive said propellers, and means to control said vehicle on land and in the air.

19. The vehicle as defined in claim 18, wherein the chassis includes slotting on each of its sides, said slotting being of such size and extent as to be adapted to receive the supplemental airfoils and to contain them substantially within the overall configuration of the chassis when the said airfoils are retracted.

References Cited in the file of this patent

UNITED STATES PATENTS

| Number | Name | Date |
|---|---|---|
| 1,622,191 | Filippi | Mar. 22, 1927 |
| 1,980,246 | Austin | Nov. 13, 1934 |
| 2,108,093 | Zimmerman | Feb. 15, 1938 |
| 2,241,577 | Beals | May 13, 1941 |
| 2,294,367 | Fleming | Sept. 1, 1942 |
| 2,350,608 | Griffith | June 6, 1944 |
| 2,561,291 | Rethorst | July 17, 1951 |

FOREIGN PATENTS

| Number | Country | Date |
|---|---|---|
| 409,188 | Italy | Feb. 7, 1945 |
| 452,883 | Italy | Nov. 8, 1940 |